United States Patent
Kiyotani (10) Patent No.: US 9,859,838 B2
(45) Date of Patent: Jan. 2, 2018

(54) FEEDBACK CONTROL DEVICE

(71) Applicant: MITUTOYO CORPORATION, Kanagawa (JP)

(72) Inventor: Shingo Kiyotani, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 15/190,775

(22) Filed: Jun. 23, 2016

(65) Prior Publication Data

US 2017/0019053 A1    Jan. 19, 2017

(30) Foreign Application Priority Data

Jul. 14, 2015  (JP) .................. 2015-140635

(51) Int. Cl.
  *H02P 25/098*  (2016.01)
  *H02P 29/40*   (2016.01)

(52) U.S. Cl.
  CPC ................... *H02P 29/40* (2016.02)

(58) Field of Classification Search
  CPC ................ H02P 25/098; H02P 29/40
  See application file for complete search history.

(56) References Cited

U.S. PATENT DOCUMENTS

| | | |
|---|---|---|
| 5,583,297 A | 12/1996 | Stocker et al. |
| 7,382,150 B2 | 6/2008 | Ohashi et al. |
| 2006/0238253 A1 | 10/2006 | Ohashi et al. |
| 2008/0270046 A1 | 10/2008 | Borenstein |
| 2013/0085724 A1 | 4/2013 | Singh |
| 2014/0184114 A1* | 7/2014 | Omata ............... H02P 6/08 318/400.02 |
| 2014/0265982 A1* | 9/2014 | Terashita ............ H02P 23/20 318/490 |
| 2016/0098019 A1* | 4/2016 | Kirshenboim ........ H02P 6/16 318/650 |

FOREIGN PATENT DOCUMENTS

| | | |
|---|---|---|
| EP | 0658755 A1 | 6/1995 |
| JP | 2003021566 A | 1/2003 |
| JP | 2006266738 A | 10/2006 |
| JP | 2008309752 A | 12/2008 |
| JP | 2009053164 A | 3/2009 |
| JP | 2013-021804 | 1/2013 |
| JP | 2014-183609 | 9/2014 |
| WO | 9930215 A1 | 6/1999 |

OTHER PUBLICATIONS

The extended European search report for European Application No. 16179197.5-1802, dated Dec. 14, 2016.

* cited by examiner

*Primary Examiner* — Shawki S Ismail
*Assistant Examiner* — Muhammad S Islam
(74) *Attorney, Agent, or Firm* — Greenblum & Bernstein, P.L.C.

(57) ABSTRACT

Motor control device includes a controller controlling a motor (a calculator controller and an electric current controller), and a detector (an electric current loop) detecting an electric current of the motor and returning the detected electric current to the controller. The electric current loop includes a first detection system, a second detection system, and an electric current calculator which sums output signals from each system. Each detection system includes a sensor detecting the electric current of the motor, and a weight adjuster outputting to the electric current calculator, a detection electric current value from each sensor multiplied by a weight coefficient.

7 Claims, 9 Drawing Sheets

FEEDBACK CONTROL DEVICE

CROSS-REFERENCE TO RELATED APPLICATIONS

The present application claims priority under 35 U.S.C. §119 of Japanese Application No. 2015-140635, filed on Jul. 14, 2015, the disclosure of which is expressly incorporated by reference herein in its entirety.

BACKGROUND OF THE INVENTION

1. Field of the Invention

The present invention relates to a feedback control device and also relates to a control device performing feedback control of a motor of various mechanical devices.

2. Description of Related Art

Conventionally, an electric motor is used as a driving source of various mechanical devices. Particularly, operation at high accuracy is required while ensuring sufficient driving force for a measuring apparatus, a machine tool, and the like. To meet such a requirement, a feedback control device having triple control loops (position loop, speed loop, and electric current loop (torque loop)) is used as a control device controlling the motor (see Japanese Patent Laid-open Publication No. 2013-021804).

Of these loops, the electric current loop may be subjected to performance restriction by an electric current sensor for feeding back. For example, a sensor detecting micro currents at high accuracy experiences difficulty in securing a wide detection range extending from micro currents to large currents. On the other hand, a sensor detecting large currents experiences difficulty in detecting electric currents with a high degree of accuracy. In order to eliminate such restrictions, a method has been suggested in which a plurality of electric current detection systems are used on the electric current loop (see Japanese Patent Laid-open Publication No. 2014-183609).

In Japanese Patent Laid-open Publication No. 2014-183609, a sensor capable of measuring over a wide range covering a large current is used and its output is divided into two systems and an amplifier is provided to a first system. For large currents, sensor output obtained through a system without the amplifier is used as is, while for micro currents, the sensor output is amplified by the amplifier to obtain high accuracy.

In a case where the plurality of electric current detection systems mentioned in Japanese Patent Laid-open Publication No. 2014-183609 are used by switching between the systems, a difference in the signals output by each system may arise. When the signal output difference is generated by each system, an electric current value that is fed back changes abruptly due to switching between the plurality of electric current detection systems, and therefore concerns may arise such as an excessive flow of the electric current and instability of the electric current loop. Accordingly, the output difference which accompanies switching between the electric current detection systems is preferably kept to a minimum.

This has been addressed by Japanese Patent Laid-open Publication No. 2014-183609 such that each system is preferably provided with an equivalent or common sensor (paragraph [0007] of Japanese Patent Laid-open Publication No. 2014-183609). However, even with a sensor having identical characteristics, a difference may arise due to changes over time. In addition, even with a common sensor, an output difference may be generated by having the amplifier.

Further, there may be a desire for selectively using a sensor for the large current and a sensor for the micro current. For such different sensors, in order to eliminate the output differences of each, a case may be considered where an amplifier is provided to adjust each output. However, even with such techniques, the amplifier adjusting each output may experience changes over time. Therefore, a configuration is desired which is capable of preventing or reducing a dramatic change in the detection value at the time of switching between the detection systems.

These concerns are not limited to feeding back the electric current loop, but may also be concerns for feeding back the speed loop and the position loop. Particularly, in the electric current loop, an excessive flow of the electric current is a serious concern for circuits and wiring.

SUMMARY OF THE INVENTION

The present invention provides a feedback control device capable of switching between a plurality of detection systems and of preventing or reducing a dramatic change in a detection value at a time of switching.

The feedback control device of the present invention includes a controller controlling a motor and a detector detecting an operation status of the motor and returning the status to the controller. The detector includes a plurality of detection systems and a calculator summing output signals from the detection systems. The detection systems each includes a sensor detecting the operation status of the motor and an adjuster outputting to the calculator, the output signal from the sensor multiplied by a weight coefficient.

In the present invention, it becomes possible to selectively utilize characteristics of each sensor due to the plurality of detection systems. For example, in an electric current loop, with any of the electric current sensors configured to have high detection accuracy but a narrow detection range, and other electric current sensors configured to have a wide detection range but low detection accuracy, by applying a detection system having a sensor with a high degree of accuracy to a micro current while applying a detection system having a sensor with a wide detection range to a large current, feedback control can be performed according to the electric current value.

At this point, signal output from the plurality of detection systems is multiplied by a weight coefficient at each adjuster and refined, then summed at a calculator. In other words, by manipulating each weight coefficient, the signal output from the plurality of detection systems can be mixed at a predetermined ratio. Specifically, the weight coefficients of the two detection systems are each defined between 0 and 1 and total to 1. By defining the coefficients at 0.3+0.7=1 for example, mixing is possible at a 3:7 ratio. The first system is gradually increased from 0 to 1 while the second system is gradually decreased from 1 to 0. Therefore, the output signal of the detector can be switched so as to transfer smoothly from the output signal of the first detection system to the output signal of the second detection system. Accordingly, even with the detector having the plurality of detection systems, gradual transfer is possible without switching simultaneously and thus enabling prevention or reduction of a dramatic change in the detection value.

In the feedback control device of the present invention, each of the adjusters uses the output signal from any of the sensors as a common reference signal. When the reference signal changes from a lower limit value to an upper limit value defined in advance, the weight coefficient is preferably defined so as to gradually increase or decrease.

In the present invention, each of the plurality of detection systems uses the output signal from the sensor of any of the systems as the common reference signal, and therefore each weight coefficient can accurately and readily be correlated (for example, defined so that the total equals 1). In addition, by providing the lower limit value and the upper limit value of the common reference signal, switching behavior of each system can be freely configured. For example, configurations are possible such as performing relatively sudden switching in narrow ranges, extending a state where the plurality of systems operate in parallel in wide ranges, or the like.

In the feedback control device of the present invention, the detection system includes a first detection system and a second detection system. The first detection system includes a first sensor, the first sensor having a higher accuracy than the sensor of the second detection system. The second detection system includes a second sensor, the second sensor having a wider detection range than the sensor of the first detection system. The adjuster of the first detection system and the adjuster of the second detection system both preferably use the output signal from the second sensor as the reference signal and define the weight coefficients.

In the present invention, in a case where variation in the operation status of the motor is small and high resolution detection of the operation status is required, high resolution detection is performed in the first detection system. When the variation in the operation status of the motor is large and high resolution is not required, detection over a wide range can be accommodated in the second detection system. Further, the output signal of the second sensor having the wide detection range is used as the reference signal, and therefore an entire range of the operation status of the motor can be covered and switching between each of the systems can be performed accurately.

The feedback control device of the present invention is preferably configured with an electric current detector as the detector, an electric current sensor having relatively high detection accuracy as the first sensor, and an electric current sensor having a relatively wide detection range as the second sensor.

In the present invention, the above operation of gradually switching between the plurality of detection systems can be applied to the electric current feedback control. In the electric current loop, there is a serious concern regarding excessive flow of the electric current over a circuit or a wiring. However, with the present invention, such excessive electric current can be prevented.

The present invention enables switching between the plurality of detection systems and also preventing or reducing the dramatic change in the detection value at the time of switching between the detection systems.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
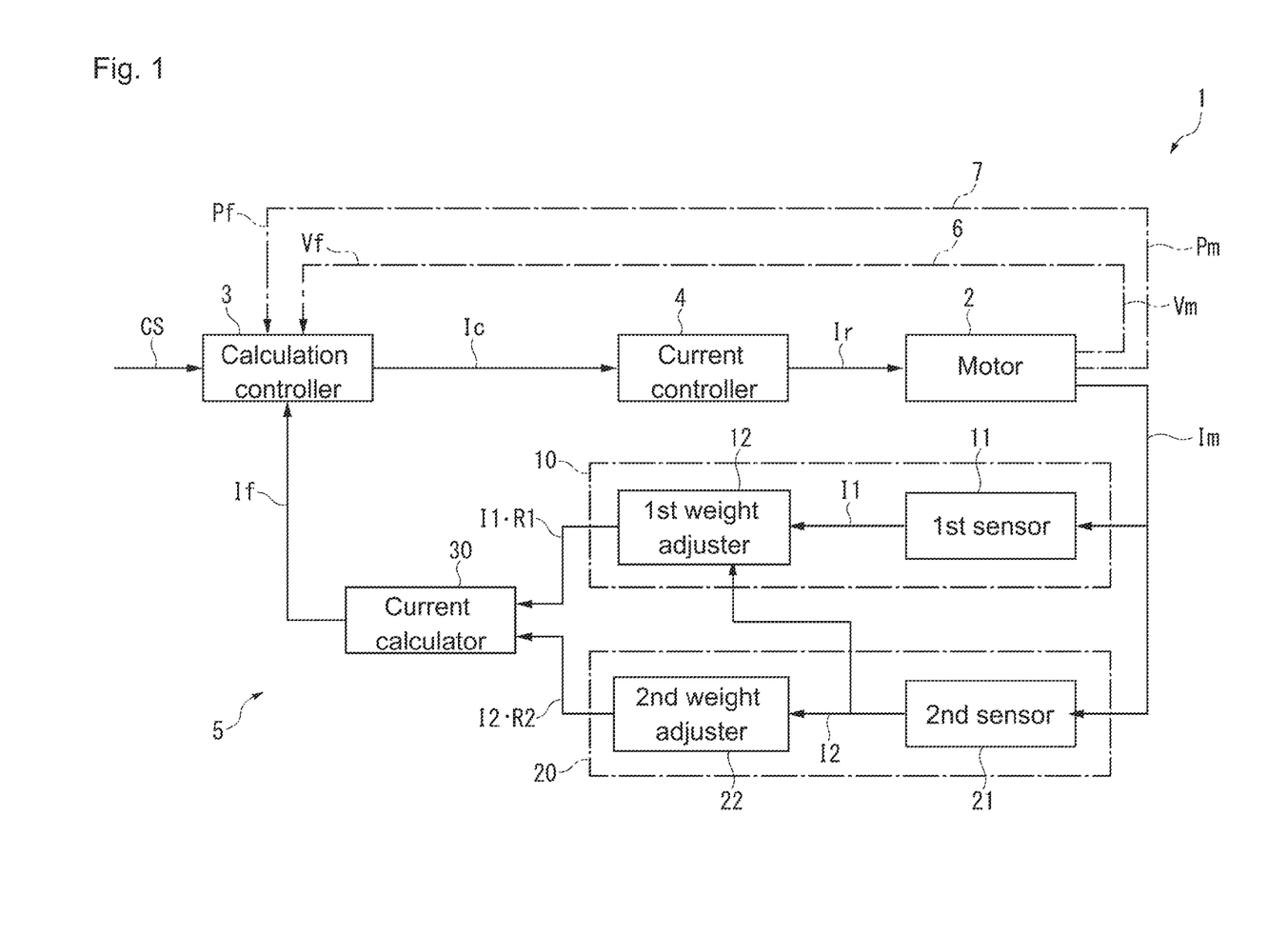
FIG. 1 is a block diagram illustrating a control circuit according to a first embodiment of the present invention.

FIG. 1 illustrates a control circuit of a motor control device 1 according to a first embodiment of the present invention. The motor control device 1 controls a motor 2 installed in displacement mechanisms of each axis of a coordinate measuring device, for example. The motor control device 1 performs feedback control based on a command signal CS input from an external operation command device. Therefore, the motor control device 1 includes a controller (a calculation controller 3 and an electric current controller 4) controlling the motor 2 and is configured by a triple feedback control system having a speed loop 6 and a position loop 7 outside of an electric current loop 5.

The calculation controller 3 outputs an electric current command value Ic based on the command signal CS. The electric current controller 4 supplies driving electric current Ir to the motor 2 based on the electric current command value Ic. When the motor 2 is driven by the driving electric current Ir, a present electric current Im of the motor 2 is detected through the electric current loop 5 and is fed as a detection electric current value If back to the calculation controller 3.

When one of the displacement mechanisms is operated by the motor 2, a present speed Vm of the displacement mechanism is detected through the speed loop 6 and is fed as a detection speed Vf back to the calculation controller 3. In addition, a present position Pm of the displacement mechanism is detected through the position loop 7 and is fed as a detection position Pf back to the calculation controller 3.

The electric current loop 5 includes a plurality of detection systems based on the present invention: a first detection system 10, a second detection system 20, and also an electric current calculator 30 summing output signals from each of the systems 10 and 20. Each of the detection systems 10 and 20 includes sensors 11 and 21 and weight adjusters 12 and 22, respectively. The sensors 11 and 12 detect the electric current Im of the motor 2. The weight adjusters 12 and 22 output detection electric current values I1 and I2 from each of the sensors, multiplied by weight coefficients R1 and R2, to the electric current calculator 30.

In other words, in the first detection system 10, the first sensor 11 detects the electric current Im of the motor 2 and outputs the detection electric current value I1. Then, the first weight adjuster 12 multiplies the detection electric current value I1 by the weight coefficient R1 and a resulting signal I1·R1 is output to the electric current calculator 30. Similarly, in the second detection system 20, the second sensor 21 detects the electric current Im of the motor 2 and outputs the detection electric current value I2. Then, the second weight adjuster 22 multiplies the detection electric current value I2 by the weight coefficient R2 and a resulting signal I2·R2 is output to the electric current calculator 30.

The electric current calculator 30 combines the output signal I1·R1 from the first detection system 10 and the signal I2·R2 from the second detection system 20 and returns the detection electric current value If=I1·R1+I2·R2 to the calculation controller 3.

In the present embodiment, in the first sensor 11 of the first detection system 10, a high accuracy electric current sensor is used having a narrow electric current detection range but a high degree of detection accuracy. In addition, in the second sensor 21 of the second detection system 20, a wide range electric current sensor is used having a wide electric current detection range but a low degree of detection accuracy. In order to switch gradually between the first detection system 10 and the second detection system 20, the first weight adjuster 12 and the second weight adjuster 22 are provided with the weight coefficients R1 and R2 having the characteristics shown in FIGS. 2 and 3.

Figure 2:
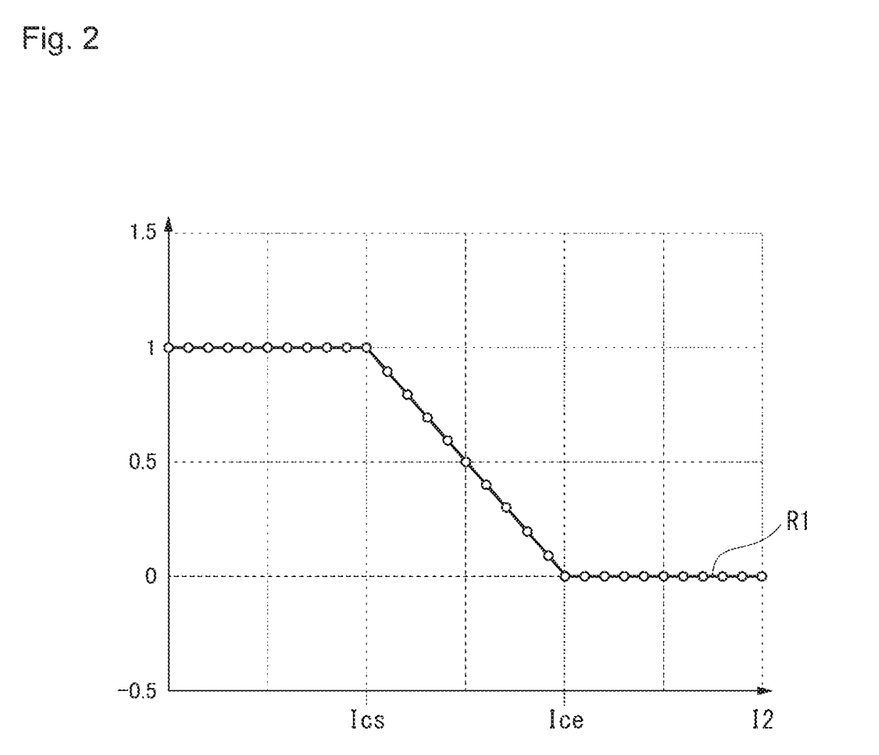
FIG. 2 is a graph illustrating a first weight coefficient R1 according to the first embodiment.
Figure 3:
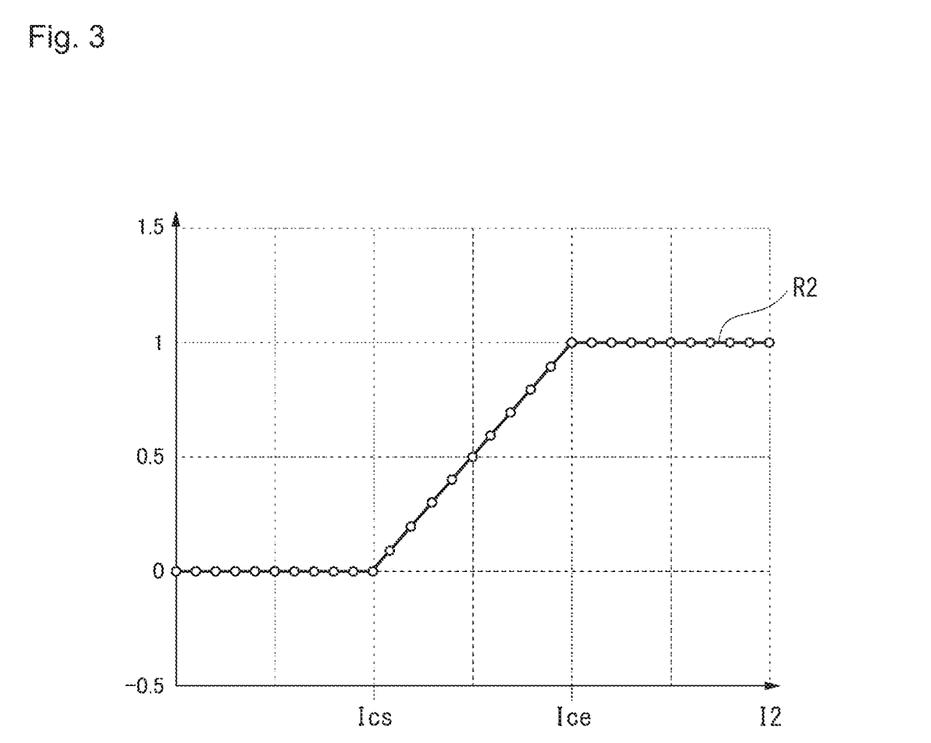
FIG. 3 is a graph illustrating a second weight coefficient R2 according to the first embodiment.

In this example, in the first weight adjuster 12 and the second weight adjuster 22, the detection electric current value I2 of the second sensor 21 (the electric current sensor having the wide range) is a common reference signal. Further, in order to define an operation range within which switching between the systems 10 and 20 occurs, a lower limit value Ics and an upper limit value Ice with respect to the reference signal are defined in advance.

In FIG. 2, when the detection electric current value I2 is less than the lower limit value Ics, the weight coefficient R1 of the first weight adjuster 12 is constant at R1=1. When the detection electric current value I2 is in a range of equal to or greater than the lower limit value Ics and less than the upper limit value Ice, the weight coefficient R1 is simply decreased and is expressed by the weight coefficient R1=1−(I2−Ics)/(Ice−Ics). When the detection electric current value I2 is equal to or greater than the upper limit value Ice, the weight coefficient R1 is constant at R1=0.

In FIG. 3, when the detection electric current value I2 is less than the lower limit value Ics, the weight coefficient R2 of the second weight adjuster 22 is constant at R2=0. When the detection electric current value I2 is in a range of equal to or greater than the lower limit value Ics and less than the upper limit value Ice, the weight coefficient R2 is simply increased and expressed by R2=(I2−Ics)/(Ice−Ics). When the detection electric current value I2 is equal to or greater than the upper limit value Ice, the weight coefficient R2 is constant at R2=1.

With these weight coefficients R1 and R2, the sum of the coefficients (R1+R2) is always 1. In other words, when the detection electric current value I2 is less than the lower limit value Ics, the sum of the weight coefficients is constant at (R1+R2)=1. When the detection electric current value I2 is in a range of equal to or greater than the lower limit value Ics and less than the upper limit value Ice, the weight coefficient R1 is simply increased while the weight coefficient R2 is simply decreased, and the sum of the weight coefficients is constant at (R1+R2)=1. When the detection electric current value I2 is equal to or greater than the upper limit value Ice, the sum of the coefficients is constant at (R1+R2)=1.

Accordingly, by using the weight coefficients R1 and R2, the output signals from each of the sensors 11 and 21 can be mixed such that a ratio of each changes gradually. In other words, in the electric current calculator 30, when the detection electric current value I2 is less than the lower limit value Ics, because the weight coefficient R1 is at R1=1 and the weight coefficient R2 is at R2=0, the detection electric current value If is defined at If=I1·R1+I2·R2=I1.

In addition, when the detection electric current value I2 is in a range of equal to or greater than the lower limit value Ics and less than the upper limit value Ice, the weight coefficient R1 is simply increased while the weight coefficient R2 is simply decreased. Therefore, the detection electric current value If has the detection electric current values I1 and I2 mixed at ratios corresponding to the weight coefficients R1 and R2. Moreover, when the detection electric current value I2 is less than the upper limit value Ice, because the weight coefficient R1 is at R1=0 and the weight coefficient R2 is at R2=1, the detection electric current value If is defined at If=I1·R1+I2·R2=I2.

The gradual switch between the first detection system 10 and the second detection system 20 according to the present embodiment, and more specifically the switching between the detection electric current values I1 and I2 of the detection electric current value If, is performed as follows.

Figure 4:
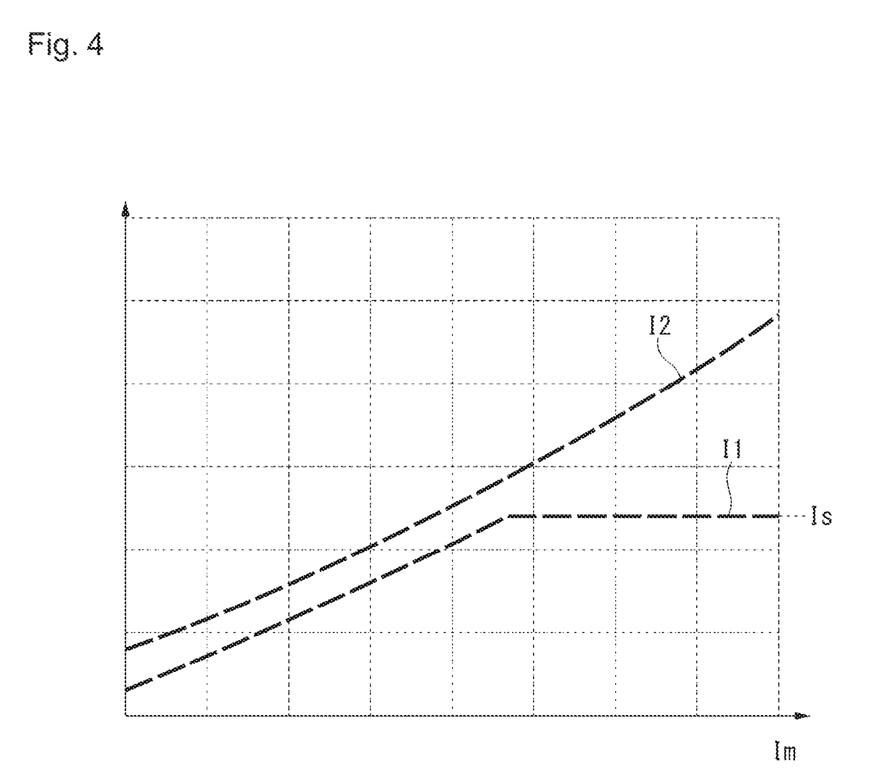
FIG. 4 is a graph illustrating a first detection electric current value I1 and a second detection electric current value I2.

As shown in FIG. 4, even though the electric current Im of the motor 2 is the same, the detection electric current value I1 of the first sensor 11 and the detection electric current value I2 of the second sensor 21 are not the same. The first sensor 11, which is the high accuracy electric current sensor with a high degree of electric current detection accuracy but a narrow detection range, is used in a region where the electric current Im of the motor 2 is minute. Therefore, when the electric current Im of the motor 2 becomes large, the electric current Im exceeds the detection range of the first sensor 11 and the detection electric current value I1 enters a saturated state at a saturated electric current value Is.

In contrast, the second sensor 21 is the wide range electric current sensor having low electric current detection accuracy but a wide detection range, and therefore the detection electric current value I2 is not saturated and can be used over an entire variation range of the electric current Im of the motor 2. Further, even though the electric current Im is the same in the effective detection range (non-saturated area) of the first sensor 11, there is a deviation in the detection electric current values I1 and I2 from each of the sensors 11 and 21.

The first sensor 11 and the second sensor 21 are used by switching between the sensors 11 and 21 based on a magnitude of the electric current Im of the motor 2. Specifically, the high accuracy first sensor 11 is used in a region where the electric current Im of the motor 2 is small while the wide range second sensor 21 is used in a region where the electric current Im of the motor 2 is large. In this way, the present embodiment switches between the detection electric current values I1 and I2 output from each sensor and feeds back to the calculation controller 3 as the detection electric current value If.

Figure 5:
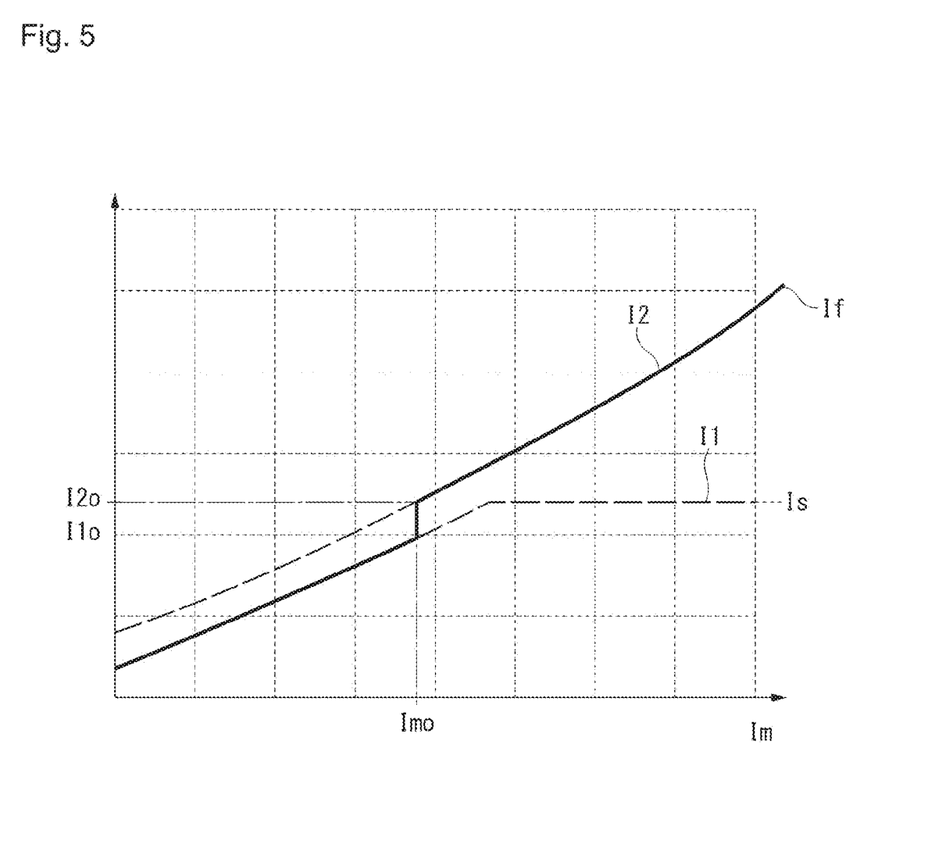
FIG. 5 is a graph illustrating a detection electric current value If when a switch operation is performed.

As shown in FIG. 5, based on the output deviation of the first sensor 11 and the second sensor 21 mentioned above, at a time when the electric current Im=Imo, the detection electric current value I1=I1o differs from the detection electric current value I2=I2o. Therefore, when the detection electric current values I1 and I2 are switched simultaneously at the time when the electric current Im=Imo, variation having a steep step shape is caused in the detection electric current value If. When such a step-shaped variation in the detection electric current value If is fed back to the calculation controller 3, the calculation controller 3 sends the electric current command value Ic corresponding to the step-shaped variation to the electric current controller 4.

As a result, concerns may arise such as an abrupt operation of the motor 2, excessive flow of electric current, and the like.

Figure 6:
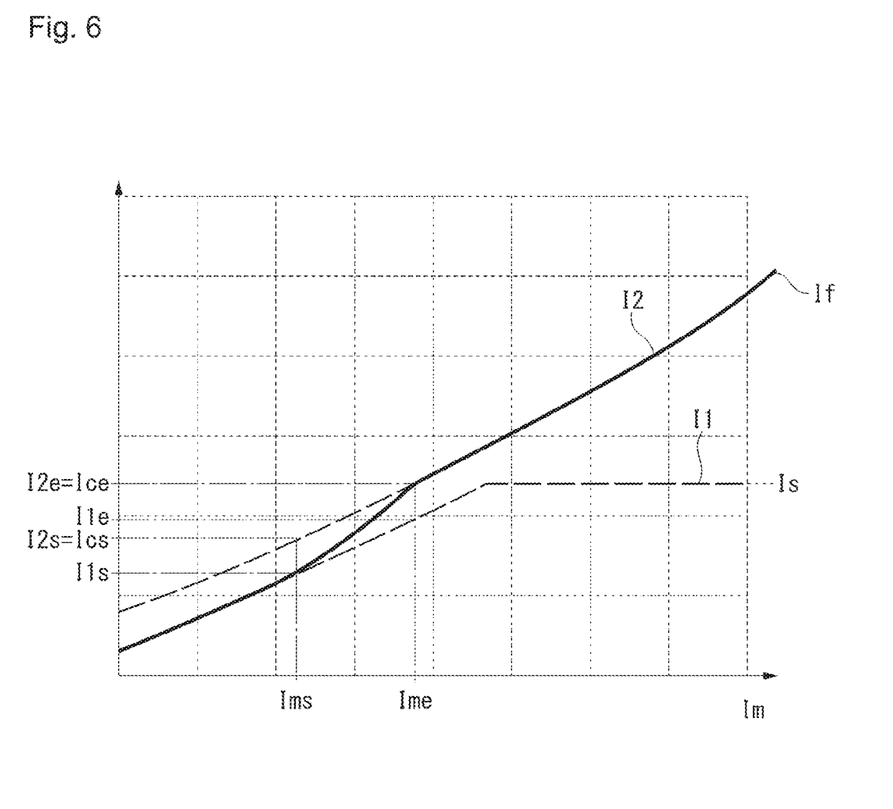
FIG. 6 is a graph illustrating the detection electric current value If when a weight adjustment operation is performed.

However, in the present embodiment, by performing a gradual switch using the weight coefficients R1 and R2, abrupt variation in the detection electric current value If is prevented. In FIG. 6, when the detection electric current value I2 which is the reference signal is the lower limit value Ics, the detection electric current value I2 is defined at I2=I2s (=Ics) and the detection electric current value I1 is at I1=I1s (I1s<I2s), and the electric current Im of the motor 2 is Im=Ims. In addition, when the detection electric current value I2 which is the reference signal is the upper limit value Ice, the detection electric current value I2 is defined at I2=I2e (=Ice), the detection electric current value I1 is at I1=I1e (I1e<I2e), and the electric current Im of the motor 2 is Im=Ime.

In the region where the detection electric current value I2 which is the reference signal is smaller than the lower limit value Ics (region where the electric current Im<Ims), the weight coefficient R1 is at R1=1 and the weight coefficient R2 is at R2=0. Therefore, the detection electric current value If=I1; that is, only the output signal from the first sensor 11 is selected. In the region where the detection electric current value I2 is larger than the lower limit value Ics and smaller than the upper limit value (region where the electric current Im is between Ims and Ime), the detection electric current values I1 and I2 are mixed in accordance with the weight coefficients R1 and R2, and the detection electric current If is switched gradually from the detection electric current value I1 of the first sensor 11 to the detection electric current value I2 of the second sensor 21. In the region where the detection electric current value I2 is larger than the upper limit value Ice (region where electric current Im>Ims), the weight coefficient R1 is at R1=0 and the weight coefficient R2 is R2=1, so the detection electric current value If=I2; that is, only the output signal from the second sensor 21 is selected.

Accordingly, in the present embodiment, switching between the detection electric current value I1 of the first sensor 11 and the detection electric current value I2 of the second sensor 21 is performed at a gentle pace, and therefore the abrupt variation in the detection electric current value If can be prevented. Further, in each of the first detection system 10 and the second detection system 20, the output signal from the second sensor 21 is defined as the common reference signal, and therefore the weight coefficients R1 and R2 can accurately and readily be correlated (for example, defined so that the total equals 1).

Furthermore, the output signal from the second sensor having a wide detection range is used as the reference signal, and therefore an entire range of the operation status of the motor 2 can be covered and the switching between the first detection system 10 and the second detection system 20 can be performed accurately. In addition, by defining the lower limit value Ics and the upper limit value Ice of the common reference signal, the switching behavior of the first detection system 10 and the second detection system 20 can be freely configured. For example, configurations are possible such as performing relatively sudden switching in narrow ranges, extending a state where the plurality of systems operate in parallel in wide ranges, or the like.

Second Embodiment

Figure 7:
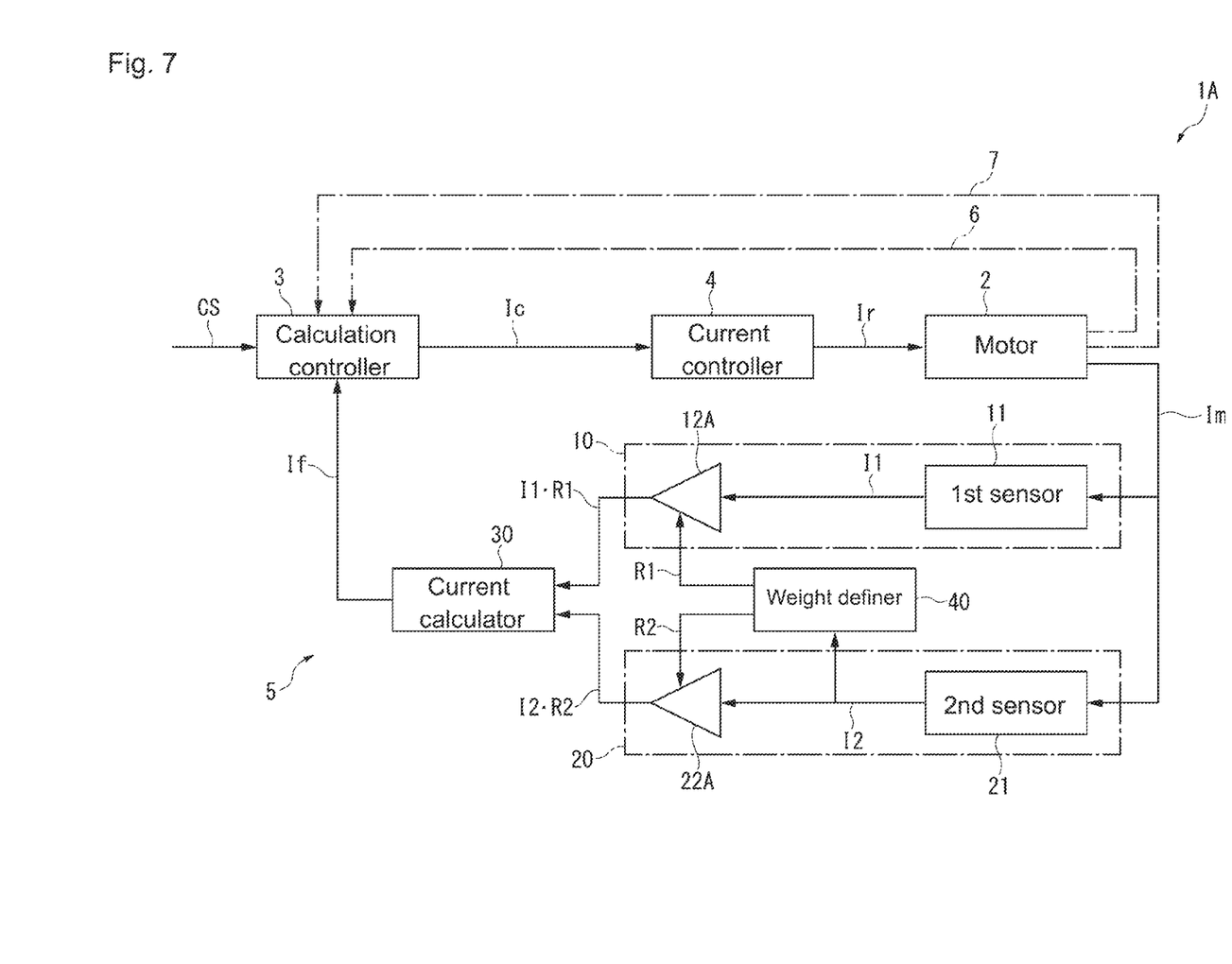
FIG. 7 is a block diagram illustrating a control circuit according to a second embodiment of the present invention.

FIG. 7 illustrates a second embodiment according to the present invention. A motor control device 1A of the present embodiment has a basic configuration similar to that of the motor control device 1 of the first embodiment, described above. Accordingly, duplicative descriptions of shared configurations are omitted and only those configurations that are differentiated are described below.

In the first embodiment above, the first weight adjuster 12 and the second weight adjuster 22 are provided to the first detection system 10 and second detection system 20 as shown in FIG. 1. By referring to the detection electric current value I2 which is the reference signal for both, and by adjusting the weight coefficients R1 and R2, the detection electric current value If=I1·R1+I2·R2 is returned to the calculation controller 3.

In contrast, in the present embodiment, as shown in FIG. 7, a first weight adjuster 12A and a second weight adjuster 22A are provided to the first detection system 10 and second detection system 20. However, each adjuster is simply an amplifier. A weight definer 40 is connected to the first weight adjuster 12A and the second weight adjuster 22A.

The weight definer 40 adjusts, in reference to the detection electric current value I2 which is the reference signal, the weight coefficients R1 and R2 based on the lower limit value Ics and the upper limit value Ice, which are similar to the first embodiment, and outputs the weight coefficients R1 and R2 to the first weight adjuster 12A and the second weight adjuster 22A. Based on these weight coefficients R1 and R2, the first weight adjuster 12A and the second weight adjuster 22A adjust a balance between the detection electric current value I1 of the first sensor 11 and the detection electric current value I2 of the second sensor 21.

As a result, in the electric current calculator 30, similar to the first embodiment, the detection electric current value If=I1·R1+I2·R2 is calculated and can be returned to the calculation controller 3. Accordingly, in the second embodiment, effects similar to that of the first embodiment above can be achieved.

Third Embodiment

Figure 8:
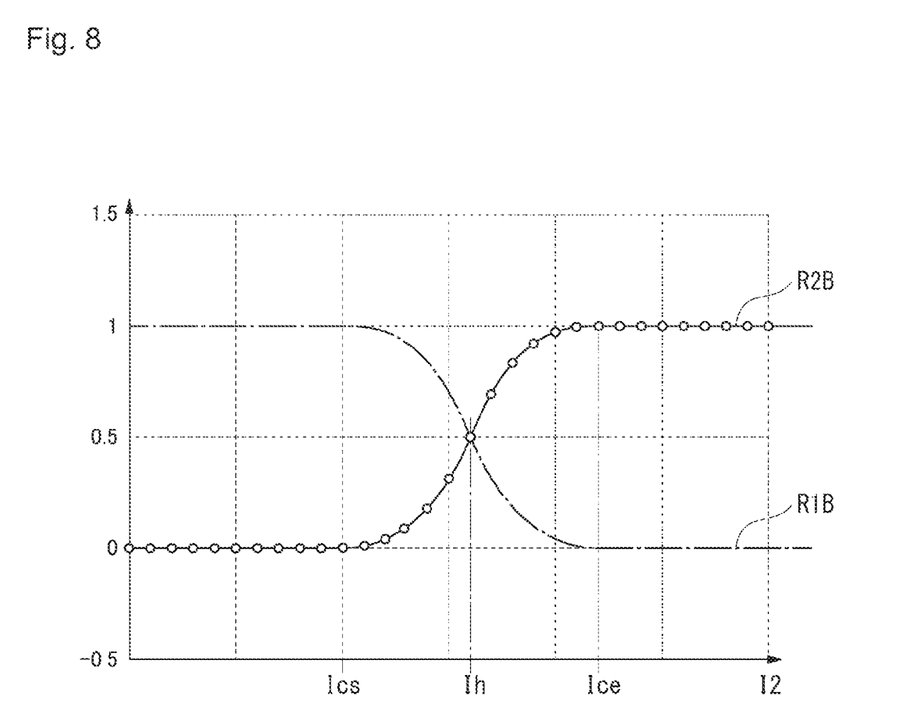
FIG. 8 is a graph illustrating weight coefficients R1 and R2 according to a third embodiment of the present invention.

FIG. 8 illustrates a third embodiment according to the present invention. In the present embodiment, a basic configuration is the same as the motor control device 1 according to the first embodiment above, however the setting of the weight coefficients R1 and R2 is different. Accordingly, weight coefficients R1 and R2 having a different configuration are described below.

In the first embodiment above, the weight coefficients R1 and R2 are shown in a broken line changing direction at the lower limit value Ics and the upper limit value Ice. In contrast, in the present embodiment, a weight coefficient R2B is defined by a hyperbolic tangent function. Specifically, R2B is defined as R2B=tan h(I2−Ih)+0.5, where Ih=(Ics+Ice)/2. Meanwhile, a weight coefficient R1B is defined as R1B=1−R2b (locus where R2B is vertically inverted).

In this embodiment, the weight coefficients R1B and R2B are schematically similar to the broken line of the weight coefficients R1 and R2 of the first embodiment, and the bends of the line are rendered in a smooth curve. Accordingly, the variation in the detection electric current value If=I1·R1+I2·R2 returning to the calculation controller 3 can be further smoothly curved. In addition, with the hyperbolic function, setting of the first weight adjuster 12 and the second weight adjuster 22 can be simplified.

Fourth Embodiment

Figure 9:
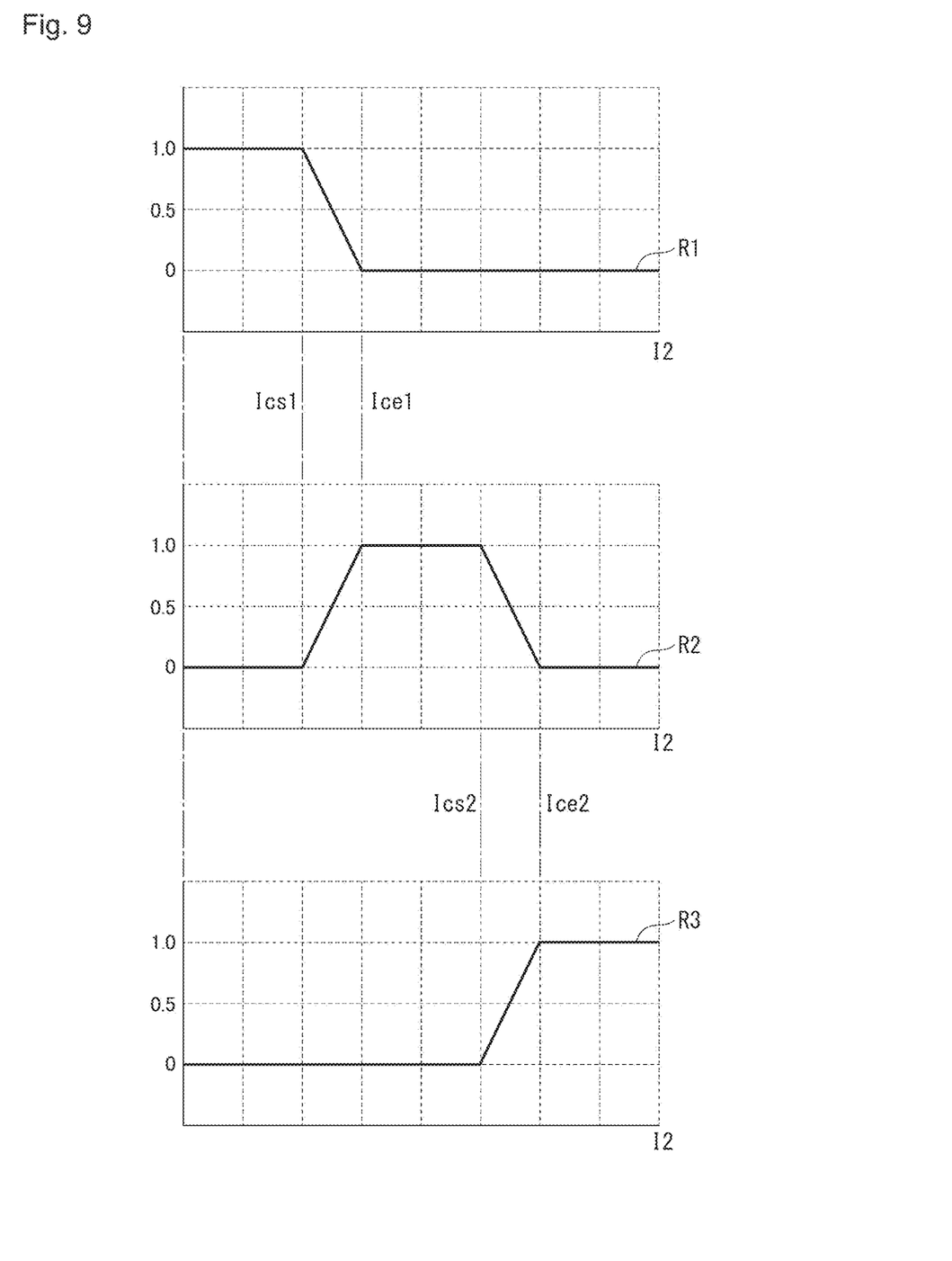
FIG. 9 shows graphs illustrating weight coefficients R1, R2, and R3 according to a fourth embodiment of the present invention.

FIG. 9 illustrates a fourth embodiment according to the present invention. The present embodiment has the same basic configuration as the motor control device 1 of the first embodiment above. However, whereas two systems (the first detection system 10 and the second detection system 20) are arranged in the first embodiment, three systems (the first, the second and a third detection system) are used in the present embodiment. Further, an example of the detection system having the three systems is to merely add one more system similar to the configuration of the detection systems 10 and 20 to the motor control device 1 of FIG. 1, and therefore this is omitted from the drawings. The detection electric current value If returned to the calculation controller 3 is If=I1·R1+I2·R2+I3·R3.

FIG. 9 illustrates the weight coefficients R1, R2, and R3 enabling gradual switching between the three systems. The weight coefficient R1 is constant at R1=1 in the region where the detection electric current value I2 which is the reference signal is smaller than a first lower limit value Ics1. The weight coefficient R1 gradually decreases when the detection electric current value I2 is equal to or greater than the first lower limit value Ics1 and is constant at R1=0 when the detection electric current value I2 is equal to or greater than a first upper limit value Ice1.

The weight coefficient R2 is constant at R2=0 in the region where the detection electric current value I2 which is the reference signal is smaller than the first lower limit value Ics1. The weight coefficient R2 gradually increases when the detection electric current value I2 is equal to or greater than the first lower limit value Ics1 and is constant at R2=1 when the detection electric current value I2 is equal to or greater than the first upper limit value Ice1. Further, the weight coefficient R2 gradually decreases when the detection electric current value I2 is equal to or greater than a second lower limit value Ics2 and is constant at R2=0 when the detection electric current value I2 is equal to or greater than a second upper limit value Ice2.

The weight coefficient R3 is constant at R3=0 in the region where the detection electric current value I2 which is the reference signal is smaller than the second lower limit value Ics2. The weight coefficient R3 gradually increases when the detection electric current value I2 is equal to or greater than the second lower limit value Ics2 and is constant at R3=1 when the detection electric current value I2 is equal to or greater than the second upper limit value Ice2.

In this embodiment, the weight coefficients R1, R2, and R3 enable sequentially switching between the three systems of the detection system. In each switching region, a switching signal from each switched system also can be gradually increased or decreased, and the variation in the detection electric current value If returned to the calculation controller 3 can be more gentle.

Other Embodiments

The present invention is not limited to the above-described configurations of the embodiments, and includes modifications within a scope capable of achieving the advantages of the present invention. For example, in each of the embodiments above, a sensor of each system has a different detection range and detection accuracy. However, a plurality of detection systems using other differing detected characteristics, differing detection principles, or the like can be configured and the present invention may be applied to switch between these detection systems.

In addition, in each of the embodiments above, the present invention is applied to the electric current loop 5. However, the present invention may be applied to the speed loop 6 or the position loop 7. Furthermore, the present invention is not limited to a measuring apparatus such as a coordinate measuring apparatus, and may be applied to a machine tool and the like.

The present invention relates to a feedback control device and can be used in a control device performing feedback control of a motor of various mechanical devices.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A feedback control device comprising:
a controller configured to control a motor; and
a detector configured to detect an operation status of the motor and to transmit the detected operation status to the controller, the detector comprising a first detection system, a second detection system and a calculator,
wherein
the first detection system comprises:
a first sensor configured to detect the operation status of the motor and to output a first detection signal to a first adjuster; and
the first adjuster configured to multiply, by a first weight coefficient, the first detection signal and a second detection signal outputted from a second sensor of the second detection system, and to output a first weighted output signal to the calculator, the second detection system comprises:

the second sensor configured to detect the operation status of the motor and to output the second detection signal to both the first adjuster and a second adjuster; and the second adjuster configured to multiply, by a second weight coefficient, the second detection signal, and to output a second weighted output signal to the calculator, and the calculator is configured to calculate a sum of the first and second weighted output signals output from the first and second detection systems.

2. The feedback control device according to claim 1, wherein:

at least one of the first adjuster and the second adjuster is configured to use either of the first detection signal or the second detection signal as a reference signal, and when a value of the reference signal changes from a predetermined lower limit value to a predetermined upper limit value, values of the first weight coefficient and the second weight coefficient are defined to gradually increase or decrease.

3. The feedback control device according to claim 2, wherein:

the first sensor having a higher detection accuracy than that of the second sensor of the second detection system, the second sensor having a wider detection range than that of the first sensor of the first detection system, and the first adjuster and the second adjuster each use the second detection signal as the reference signal and define the values of first the weight coefficient and the second weight coefficient based on the value of the reference signal.

4. The feedback control device according to claim 3, wherein:

the detector is an electric current detector;

the first sensor is an electric current sensor having a detection accuracy higher than that of the second sensor; and the second sensor is an electric current sensor having a detection range wider than that of the first sensor.

5. The feedback control device according to claim 1, wherein:

a value of the first weight coefficient and a value of the second weight coefficient are inversely related.

6. The feedback control device according to claim 1, wherein:

a sum of a value of the first weight coefficient and a value of the second weight coefficient is 1.

7. The feedback control device according to claim 2, wherein:

a value of the first weight coefficient and a value of the second weight coefficient are based on a value of the reference signal.

* * * * *